United States Patent
Atallah et al.

(10) Patent No.: US 12,050,663 B2
(45) Date of Patent: Jul. 30, 2024

(54) AUTO-ENROLLMENT FOR A COMPUTER VISION RECOGNITION SYSTEM

(71) Applicant: Toshiba Global Commerce Solutions Holdings Corporation, Tokyo (JP)

(72) Inventors: Judith L. Atallah, Raleigh, NC (US); J. Wacho Slaughter, Raleigh, NC (US); Evgeny Shevtsov, Frisco, TX (US); Srija Ganguly, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 324 days.

(21) Appl. No.: 17/490,472

(22) Filed: Sep. 30, 2021

(65) Prior Publication Data

US 2023/0102876 A1    Mar. 30, 2023

(51) Int. Cl.
| | |
|---|---|
| *G06F 18/2413* | (2023.01) |
| *G06N 3/09* | (2023.01) |
| *G06Q 20/20* | (2012.01) |
| *G06V 10/764* | (2022.01) |
| *G07G 1/00* | (2006.01) |

(52) U.S. Cl.
CPC ....... *G06F 18/2413* (2023.01); *G06Q 20/202* (2013.01); *G06N 3/09* (2023.01); *G06V 10/764* (2022.01); *G07G 1/0009* (2013.01)

(58) Field of Classification Search
CPC .............. G06F 18/2413; G06Q 20/202; G06V 10/764; G07G 1/0009; G06N 3/09
See application file for complete search history.

(56) References Cited

U.S. PATENT DOCUMENTS

| | | | | |
|---|---|---|---|---|
| 10,282,722 | B2 * | 5/2019 | Huang | G06N 20/00 |
| 11,481,751 | B1 * | 10/2022 | Chaubard | G06V 10/82 |
| 2020/0042491 | A1 * | 2/2020 | Licht | G07G 1/0045 |
| 2020/0302240 | A1 * | 9/2020 | Murata | G06F 18/2413 |
| 2021/0117948 | A1 * | 4/2021 | Voss | G06F 18/40 |
| 2023/0186601 | A1 * | 6/2023 | Hartley | G06K 7/1447 |
| | | | | 382/103 |

OTHER PUBLICATIONS

K. Shmelkov, C. Schmid, and K. Alahari, "Incremental learning of object detectors without catastrophic forgetting," in Proceedings of the 2017 IEEE International Conference on Computer Vision, Venice, Italy, 2017. (Year: 2017).*

Yuchen Wei, Son Tran, Shuxiang Xu, Byeong Kang, Matthew Springer, "Deep Learning for Retail Product Recognition: Challenges and Techniques", Computational Intelligence and Neuroscience, vol. 2020, Article ID 8875910, 23 pages, 2020. https://doi.org/10.1155/2020/8875910.

* cited by examiner

*Primary Examiner* — Matthew C Bella
*Assistant Examiner* — Janice E. Vaz
(74) *Attorney, Agent, or Firm* — Patterson + Sheridan, LLP

(57) ABSTRACT

This disclosure describes an automated process for training an ML model used by a computer vision system in a point of sale (POS) system to recognize a new item. Instead of relying on a manual process performed by a data scientist, the automated process can use images of a new (i.e., unknown) item captured at one or more POS systems to then retrain the ML model to recognize the new item. That is, the images of the item are used to retrain the ML model and to test the accuracy of the updated ML model. If the updated ML model can confidently identify the new item, the updated ML model is then used by the computer vision system to identify items at the POS system.

20 Claims, 5 Drawing Sheets

AUTO-ENROLLMENT FOR A COMPUTER VISION RECOGNITION SYSTEM

BACKGROUND

A point of sale (POS) system provides a platform for a customer to pay for goods or services. The POS system can include a scanner used to scan a barcode, quick response (QR) code, or other identifying mark to add an item to a checkout list. However, some items may not have barcodes, such as unpackaged items like fresh fruit and vegetables. Stickers with barcodes can be added to the items, but the stickers might fall off and the barcodes are often smaller and more difficult to scan. Other items, such as large or unusually shaped items may have barcodes located at difficult to scan locations. For items like these, the cashier (or customer at a self-checkout POS system) may have to manually tell the POS system the item being purchased, such as using a price look-up (PLU) code, searching through a list of images of the items, or spelling the name of the item using a user interface.

DETAILED DESCRIPTION

Figure 1:
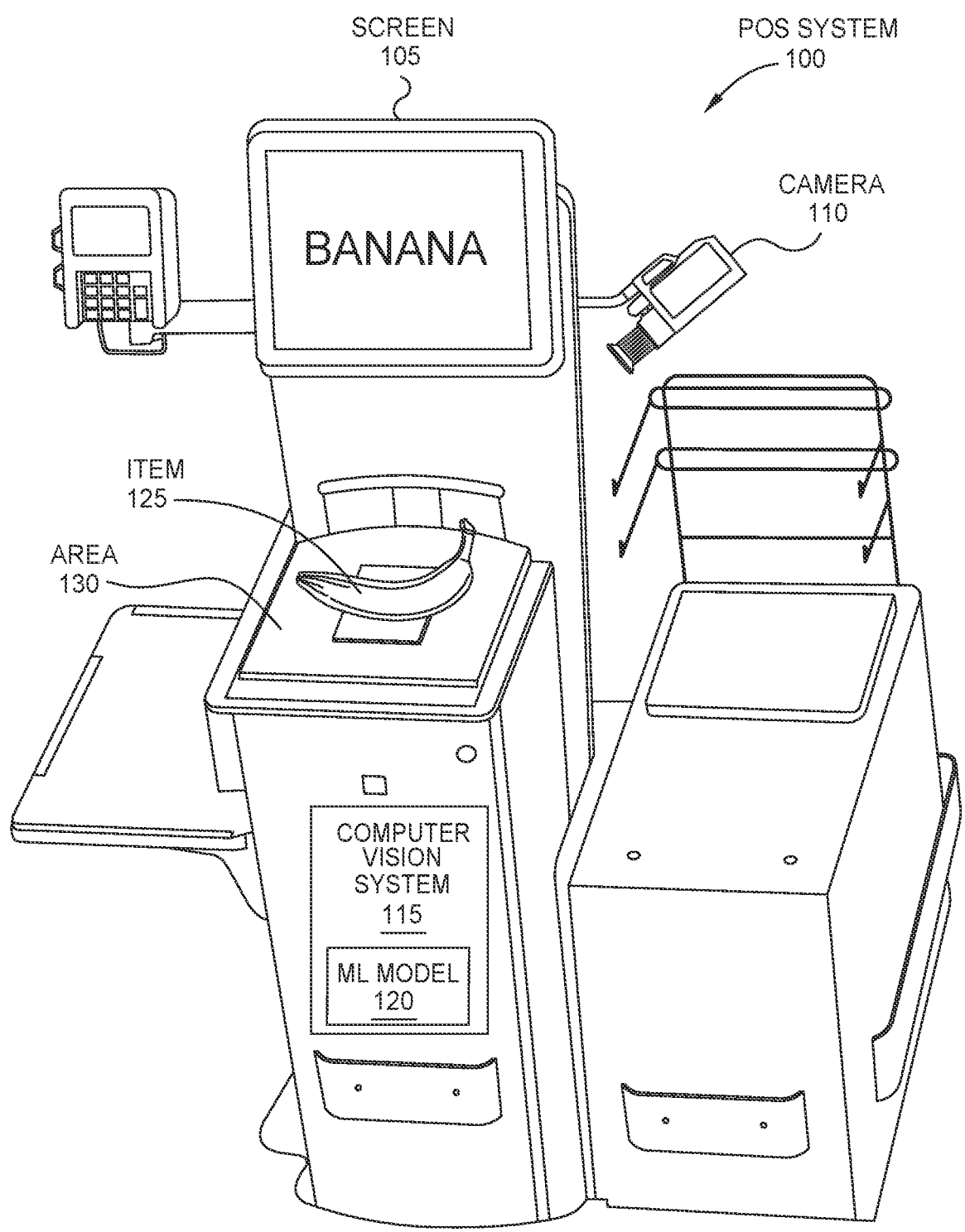
FIG. 1 illustrates a POS system that uses a machine learning (ML) model to identify an item, according to an embodiment described herein.

This disclosure describes an automated process for training an ML model used by a POS system to recognize a new item. Newer POS systems have computer vision systems that identify items from an image captured by a camera at the POS system. The computer vision systems can use machine learning (ML) models to identify (or classify) the item. The computer vision system can supplement, or even replace, the barcode scanner typically used at POS systems. However, the ML model must be trained in order to detect the items. This training process can be a manual and time consuming processing.

Instead of relying on a manual process, a computing system executes the automated process which includes using images of a new (i.e., unknown) item captured at one or more POS systems to retrain the ML model to recognize the new item. In one embodiment, the computing system divides the images of the item captured by the POS systems into a training data set and a validation data set. The images in the training data set are used to retrain the ML model while the images in the validation data set are used to test the accuracy of the updated ML model. If the updated ML model is able to accurately identify the item from the images in the validation data set, the updated ML model is then pushed down to the POS systems.

In one embodiment, the computing system executing the automated process also verifies that the updated ML model continues to accurately identify the items it was previously trained to identify. That is, as the ML model is updated (i.e., retrained) to identify additional items, the computing system verifies that the updated ML model can still accurately identify the items the previous version of the ML model was able to classify previously. In one example, the POS systems may continue to use the previous, non-updated version of the ML model if the verification step is not satisfied.

Advantages of an Automated ML Model Update Process

In one embodiment, a data center, server, or the POS system executes the automated process which can include training a ML model to identify new items and verifying that the ML model can still accurately identify other items it was previously trained to classify. The automated dual training and verification protocols executed in the automated process improves the performance of the POS system by enabling it to detect, using a computer vision system, an item being purchased without having to rely on the customer to scan a barcode, identify the item from a list of images on the POS system, or manually type in a name of the item. In some examples, that automated process also advantageously includes updating the ML model automatically (without human intervention) as new items are added to a store's inventory. In one example, the ML model is updated on the fly to improve the accuracy of the computer vision system at the POS system. Having a more accurate computer vision system can reduce the processing time (cycle time) for the POS system to complete a transaction.

FIG. 1 illustrates a POS system 100 that uses a ML model 120 to identify an item, according to an embodiment described herein. FIG. 1 illustrates a self-checkout POS system 100, but this is just one example of a suitable type of POS system. The embodiments herein can also be used in POS system operated by a cashier, shopper, or other types of POS systems.

The POS system 100 includes one or more scanners (not labeled) disposed under, above, or around an item scanning area 130. In one embodiment, the scanners are barcode scanners, QR code scanners, or any other scanner that detects identifying marks on an item 125. In one embodiment, the item scanning area 130 includes a scale for measuring the weight of the item 125.

In addition to the scanner(s), the POS system 100 includes a camera 110 that captures images of the item scanning area 130. The camera 110 can be part of a computer vision system 115 that processes the images to identify the item 125. While in FIG. 1 the computer vision system 115 operates in tandem with, or is supplemental to, the scanners, in other embodiments the POS system 100 may rely solely on the computer vision system 115 to identify the items.

The computer vision system 115 includes the ML model 120 which receives an image captured by the camera 110 as an input and determines a prediction or classification of the item 125. When the item 125 is a fruit or vegetable, the ML model 120 determines the type of fruit or vegetable (e.g., banana). As shown, the POS system 100 can also output the prediction of the ML model 120 to a screen 105 for the customer or cashier to review (i.e., output the text "banana"). While for some types of fruit or vegetables a coarse classification by the ML model 120 is sufficient, for other types the customer may have to provide further information. For example, the ML model 120 may be able to determine that the item 125 is an apple, (e.g., HONEYCRISP® apple or PINK LADY® apples) or determine a list of items that could potentially be the apple due to similar characteristics that are identified by the ML model, such as size, shape, visual appearance, color, nutritional value, organic or non-organic classification, and the like.

Once the item 125 is identified, the POS system 100 can add it to the customer's checkout list. In one embodiment, the POS system 100 may weigh the item first, or the computer vision system 115 may count the number of items 125 currently in the item scanning area 130 before adding the item to the checkout list.

In one embodiment, the ML model 120 is trained to recognize a set number of items. In some examples, the ML model represents a convolution neural network, deep neural network, k-means clustering, support vector machine, or any other type of ML algorithm suitable for computer vision. During a training stage, annotated training data can be processed by the ML model 120 so it can learn to distinguish the items. However, after the POS system 100 is operational, new items may be added to the store. That is, the store may offer fruit that changes with the season, or the store may expand its fresh produce selection. The ML model 120 is likely unable to identify these new items. As discussed in more detail below, the embodiments herein introduce an automated process to update the ML model 120 so it can identify new items.

While many of the examples herein describe using the computer visions system 115 and ML model 120 to identify unpackaged items (e.g., fresh fruits or vegetables, hammers, garden tools, etc.), it can also be used to identify packaged items such as cereal boxes, soup cans, bagged pasta, nails, light bulbs, etc. That is, the ML model 120 can be trained to distinguish between two different types of cereal, or brands of light bulbs, based on images captured by the camera 110. When the store adds additional packaged items (or a manufacturer changes the packaging of the item), the ML model 120 can be updated as described below to recognize the new or changed items.

Figure 2:
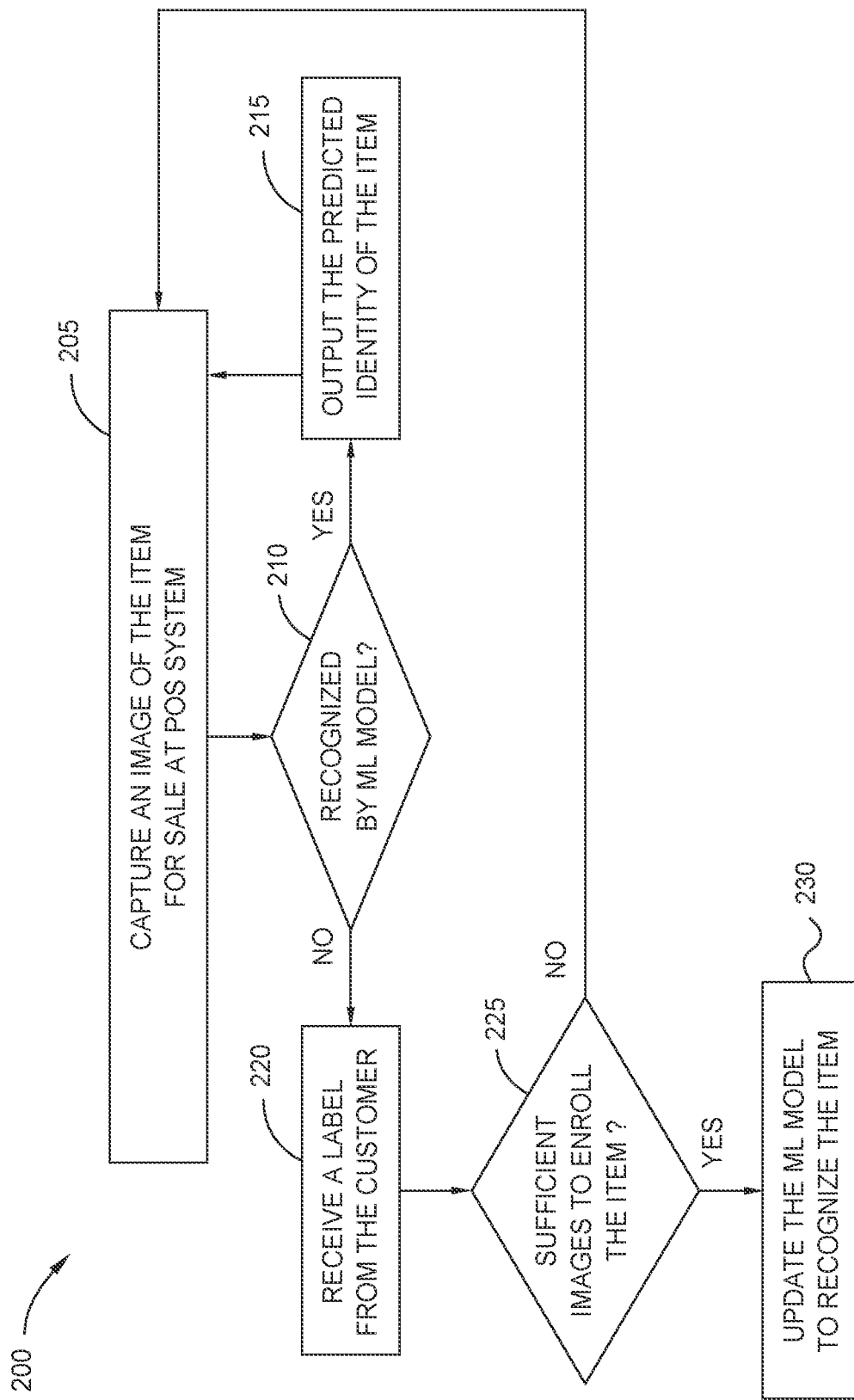
FIG. 2 is a flowchart for determining when to enroll a new item, according to an embodiment described herein.

FIG. 2 is a flowchart of a method 200 for determining when to enroll a new item, according to an embodiment described herein. At block 205, a camera at a POS system captures an image of the item for sale. In some embodiments, the POS system may have multiple cameras that capture multiple images in case one of the cameras is occluded or blocked.

In one embodiment, the viewing region of the camera includes the item scanning area 130 in FIG. 1. The POS system may trigger the camera to take an image when detecting that an item has been placed in the area 130 (e.g., using a scale, light beam, or a motion detection device). In some examples, the camera may capture an image that has multiple items in it. For example, rather than capturing an image of one item at a time, the customer may place multiple items for purchase in the area 130, or place a basket containing multiple items in a designated area. The computer vision system can detect multiple items in the image and use the ML model to identify each item as discussed below.

At block 210, the computer vision system in the POS system determines whether the ML model was able to recognize (or identify/classify) the item or items in the captured image. That is, during an inference stage of operation, the computer vision system can input the image into the ML model. The ML model determines a prediction indicating what the item is. The ML model may also determine a prediction score (e.g., a percentage) indicating how certain it is regarding its prediction. If the prediction score is too low (e.g., below a threshold percentage), the ML model may indicate to the computer vision system it was unable to accurately identify the item.

In one example, when the prediction score is above the threshold, method 200 proceeds to block 215 where the computer vision system determines the predicted identity of the item—e.g., whether it is an apple, cucumber, particular brand and type of cereal, particular garden tool, etc. The POS system may automatically add the item to the customer's checkout list, or may display the identity of the item on the display of the POS system, a third-party computing device, or a mobile computing device to enable a user to confirm the ML model accurately identified the item, or to display a message to the user requesting further information (e.g., the type of apple, or if the produce is organic).

In another example, when the ML model is unable to recognize the item, the method 200 proceeds to block 220 where the POS system receives a label of the item from the customer. In one embodiment, the POS system generates and displays a message, at the POS system, requesting that the customer (or cashier) input item information to identify the item during the checkout process by, e.g., scanning a barcode on the item, typing in a PLU code of the item, or manually typing in a name of the item. In other words, the POS system may receive the correct label of the item from a user action performed during the checkout process.

In one example, the POS system correlates the item in the image with the label provided by the customer or cashier. That is, if the store has begun selling a new seasonal fruit or a new type of hammer, the ML model has not yet been trained to recognize this item. But by the computer vision system capturing an image of the item and then the customer providing a label for the item, the image can now be used as an annotated image to train the ML model to recognize the item, as well as validate or test the ML model to verify it can accurately detect the new item.

Further, the method 200 can operate at multiple POS systems in the same store or multiple stores operated by the same company or multiple companies. For example, the manufacture of the POS systems may collect images of new items from multiple POS systems that are operated by different companies but use the same ML model.

At block 225, a model updater (which is discussed in more detail in FIG. 3) determines whether there are sufficient images to enroll the new item. In general, enrolling a new item includes retraining the ML model, testing and validating the updated ML model to verify it can accurately detect the new item, and verifying the updated ML model can still accurately detect the already enrolled items. This process is described in more detail in FIGS. 3 and 4.

While a ML model can be retrained using just one image of the new item, it is likely doing so would not result in a robustly trained ML model. Instead, as shown in block 225, the model updater may wait until multiple images of the new item have been captured (e.g., more than fifty images). The number of images used to retrain the ML model may vary depending on the type of the item as well as how similar the item is to already enrolled items. If the new item is very different from already enrolled items, then fewer images of the item may be needed. In any case, the automated process for training the ML model described herein can adapt to situations where more images of the new item are needed before it can be successfully enrolled. For example, the automated process may first try to enroll the new item using an initial threshold of fifty captured images. If enrollment is not successful, the process may set a new threshold of a hundred images. The POS system can keep capturing additional images of the item until the enrollment process is successful. However, in one embodiment, the model updater may stop the automated process if the captured images reach a maximum threshold (e.g., a thousand pictures of the new item) without the item being successfully enrolled. In that instance, the model updater may indicate the automated process was unable to enroll the item and send the task to a data scientist.

As mentioned above, the images used to enroll the new item may originate from the same POS system, multiple POS systems in the same store, POS systems in multiple stores operated by the same company, or POS systems in multiple stores operated by different companies.

If the model updater has not collected a sufficient number of images, the method 200 returns to block 205 where additional images of the item are captured. Otherwise, the method 200 proceeds to block 230 where the model updater updates the ML model to recognize the item. The details of block 230 are describe in the flowchart of FIG. 4.

While the method 200 uses images of items that were not recognized by the ML model to generate annotated images that can be used to train and validate the ML model, in other embodiments, additional images can be mined when the ML model mis-predicts an item. For example, the ML model may mistakenly determine that a new item is an item that the model is trained to identify because these items look similar to each other. For example, a store may add to its inventory a hammer with a different claw shape than hammers already in stock at the store, or the store may add clementine oranges that look similar to mandarin oranges already in stock. The ML model was trained to recognize the old type of hammers and the mandarin oranges and may mistakenly believe the new type of hammers and the clementine oranges are those items due to their similar visual features. The customer or cashier can recognize this mistake and provide the correct label for these images. The computer vision model can then use these images to retrain and validate the ML model to enroll these new items as discussed below.

Figure 3:
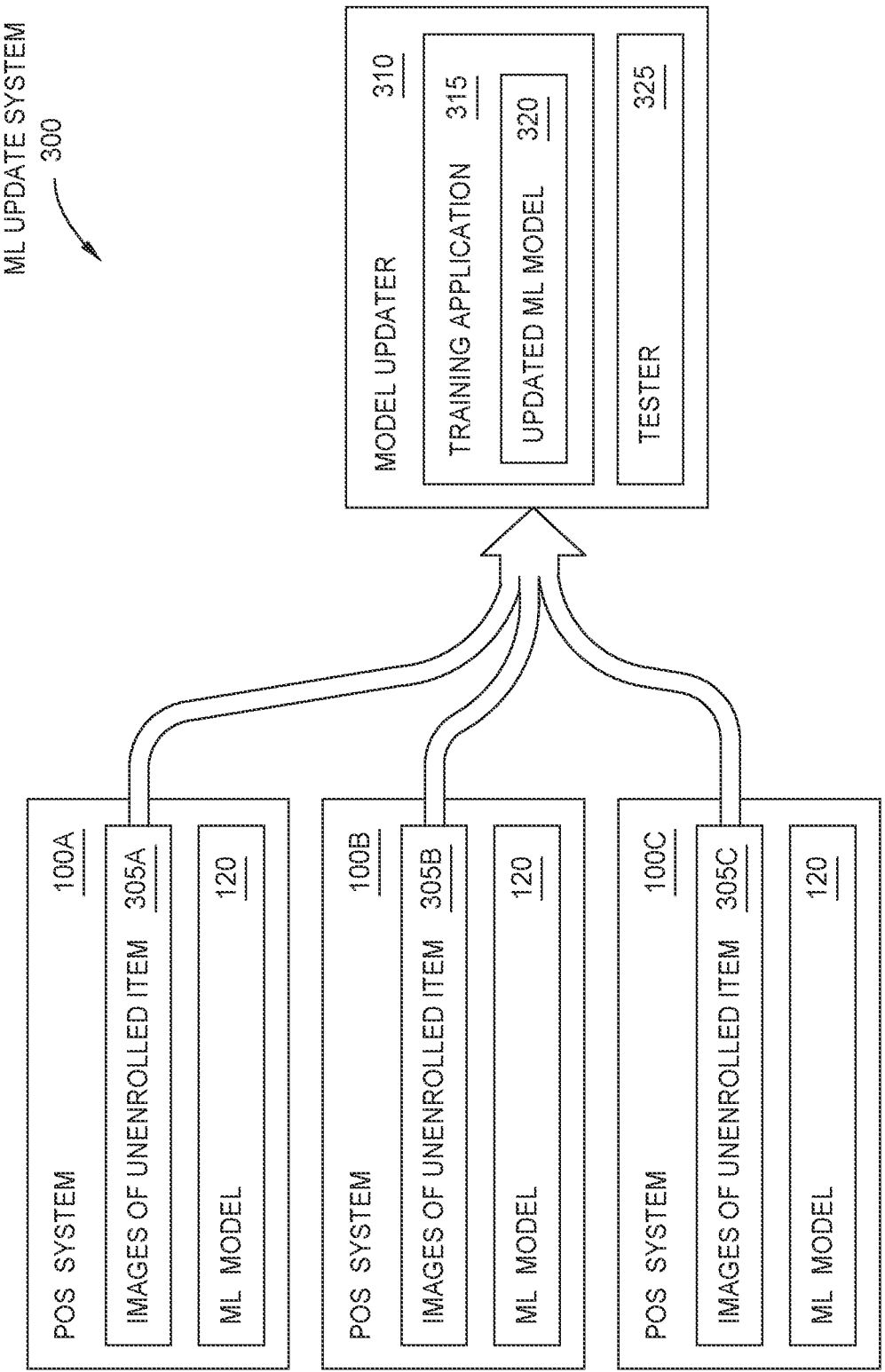
FIG. 3 illustrates a system for updating a ML model used by POS systems, according to an embodiment described herein.

FIG. 3 illustrates a ML update system 300 for updating a ML model used by POS systems, according to an embodiment described herein. The system 300 illustrates multiple POS systems 100A-C (collectively POS systems 100) transmitting captured images 305A-C of unenrolled items (i.e., new items) to a model updater 310. That is, FIG. 3 illustrates multiple POS systems 100 which can be in the same store or multiple stores transmitting different images 305A-C of the same item to the model updater 310. Again, the ML update system 300 knows these images 305A-C correspond to the same item because the customer or cashier provided the label. While FIG. 3 illustrates the POS systems 100 capturing images for the same unenrolled items, they can capture and transmit images of multiple different unenrolled items to the model updater 310.

Moreover, in this example, each of the POS systems 100 has the same ML model 120. Thus, if the same image was provided to each of the ML model 120 executing at the different POS systems, the ML model 120 would generate the same output or prediction.

The model updater 310 is tasked with collecting the images 305A-C of the unenrolled item and retrain the ML model 120 to generate an updated ML model 320 that is capable of accurately recognizing the unenrolled item. As shown, the model updater 310 includes a training application 315 and a tester 325. Both of these components may be software applications or software modules.

The training application 315 receives the images 305A-C and retrains the ML model 120 to generate the updated ML model 320. The embodiments herein can be used with any type of training algorithm suitable to train a ML model for a computer vision system. For example, if the ML model 120 includes a neural network, retraining the model 120 adjusts the weights assigned to the nodes or neurons in the neural network. However, this is just one example, and the embodiments herein are not limited to any particular type of ML model or training algorithm.

The tester 325 validates the updated ML model 320 to verify it can now accurately detect the newly enrolled item. Further, because retraining the ML model can impact its ability to accurately detect the previously enrolled items, the tester 325 can verify the updated ML model 320 can still accurately detect those items.

Figure 4:
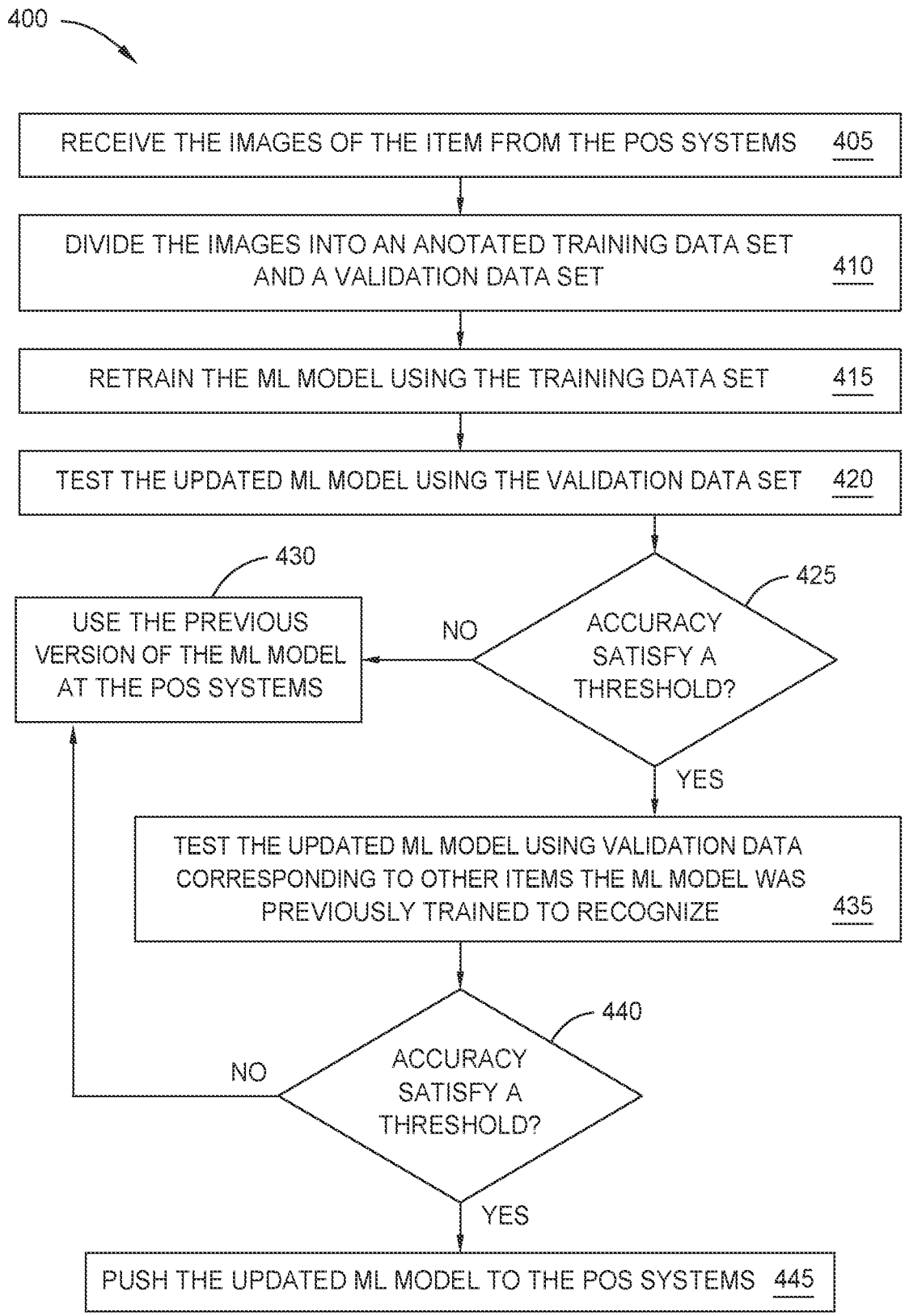
FIG. 4 is a flowchart for updating a ML model used by POS systems, according to an embodiment described herein.

FIG. 4 is a flowchart of a method 400 for updating a ML model used by POS systems, according to an embodiment described herein. At block 405, the training application (e.g., the training application 315 in FIG. 3) receives the images of the item from the POS system. The method 400 assumes that the POS system (or systems) has collected a sufficient number of images of the item to begin the enrollment process.

At block 410, the training application divides the images into an annotated training data set and a validation data set. The annotated training data set includes images of the item used to retrain the ML model to recognize the item while the validation data set includes images of the item used to validate or test the updated ML model. For example, the training application may divide the received images in half so that one half forms the annotated training data set while the second half forms the validation data set. But in other embodiments it might be advantageous to have more images in the annotated training data set than the validation data set, or vice versa.

At block 415, the training application retrains the ML model using the training data set. That is, the images in the training data set are fed as inputs into the ML model. The predictions made by the ML model are then used as feedback to adjust the ML model (e.g., adjust the weights used by the ML model). Retraining the ML model may include processing the training data set multiple times, where the ML model is adjusted each time. However, as mentioned above, the ML model can be retrained using any suitable training technique or algorithm.

At block 420, a tester (e.g., the tester 325 in FIG. 3) tests the updated ML model using the validation data set. The tester can provide the images in the validation data set as inputs to the updated ML model and then generate an accuracy measurement indicating whether the updated ML model accurately predicts that the new item is in the images. The accuracy measurement may be the percentage of correct predictions depicted by confidence level, recall-precisions, or some other indicator of accuracy.

At block 425, the tester determines whether the accuracy of the updated ML model satisfies a threshold. For example, the tester may require the updated ML model to accurately identify the item in the images of the validation data set at least 90% of the time. If the accuracy does not meet the threshold, the method 400 proceeds to block 430 where the POS systems continue to use the previous version of the ML model (e.g., the ML model 120 in FIG. 3). That is, the updated ML model is not pushed to the POS systems. In one embodiment, the training application can wait until additional images of the new item are received and then repeat blocks 405-425. Alternatively, the training application may change which images are being used in the training data set and the validation data set (e.g., swap some or all of the images, or move some of the images from the validation data set into the training data set) in hopes doing so will result in a better trained ML model.

However, if the updated ML model has an accuracy that satisfies the threshold, the method 400 proceeds to block 435 where the tester tests the updated ML model using validation data corresponding to other items the ML model was previously trained to recognize. Stated differently, the tester can verify that retraining the updated ML model did not result in it being unable to accurately detect the already enrolled items. For example, changing the weights when training a neural network to detect the new item, can negatively impact the ability of the neural network to detect previously enrolled items. As such, at block 435, the tester can verify the updated ML model can still accurately detect those items.

At block 440, the tester determines whether the accuracy of the updated ML model relative to the previously enrolled items satisfies a threshold. In one embodiment, the tester may verify that the accuracy of the updated ML model relative to the previous version of the ML model has not decreased. That is, the tester may require that the updated ML model can detect the previously enrolled items just as accurately as the previous ML model. However, in another embodiment, the tester may permit the updated ML model to lose some performance relative to the previous ML model so long as its accuracy still satisfies the threshold. For example, the previous ML model may have detected a watermelon with a confidence of 98% while the updated ML model can detect a watermelon with a confidence of 96%. If the threshold confidence is 95%, then the test determines the updated ML model satisfies the threshold, even though it is not as accurate as the previous ML model with regards to watermelon. Nonetheless, the updated ML model can still confidently detect watermelons and has the added benefit of being able to detect the newly enrolled item.

If the updated ML model is unable to confidently identify the already enrolled items, the method 400 proceeds to block 430 where the model updater can wait for additional images of the new item before repeating the method 400, or adjust/swap the number of images in the training and validation data sets as discussed previously.

If the updated ML model does confidently identify the already enrolled items, the method 400 proceeds to block 445 where the model updater pushes the updated ML model to the POS systems. The updated ML model replaces the previous version of the ML model in the POS systems. Further, the updated ML model may be transmitted to other POS systems that did not capture any images of the new item. For example, the new item may have been added to the inventory of only one store owned by a company. The model updater can rely on the images captured from the POS systems in that store to perform the method 400. Nonetheless, the model update can push the updated ML model to the POS systems in all the stores owned by that company (as well as stores owned by different companies) in anticipation that the company might want to add the new item to the inventory of those stores as well. If so, the POS systems in those stores already have ML models ready to recognize the items, without have to repeat method 400.

While the method 400 (and FIG. 3) is described in the context of executing the ML model locally in the POS systems, the embodiments herein can also be used where the POS systems rely on a remote ML model to recognize items. For example, rather than executing the ML model on computing resources in each POS system, the POS systems can instead send captured images to a central repository (e.g., a central server or cloud computing environment) that hosts the ML model. Thus, one ML model can service requests from multiple POS systems. When performing the method 400, instead of updating the ML model on all the POS systems, the model updater would only update the ML model at the central repository.

Figure 5:
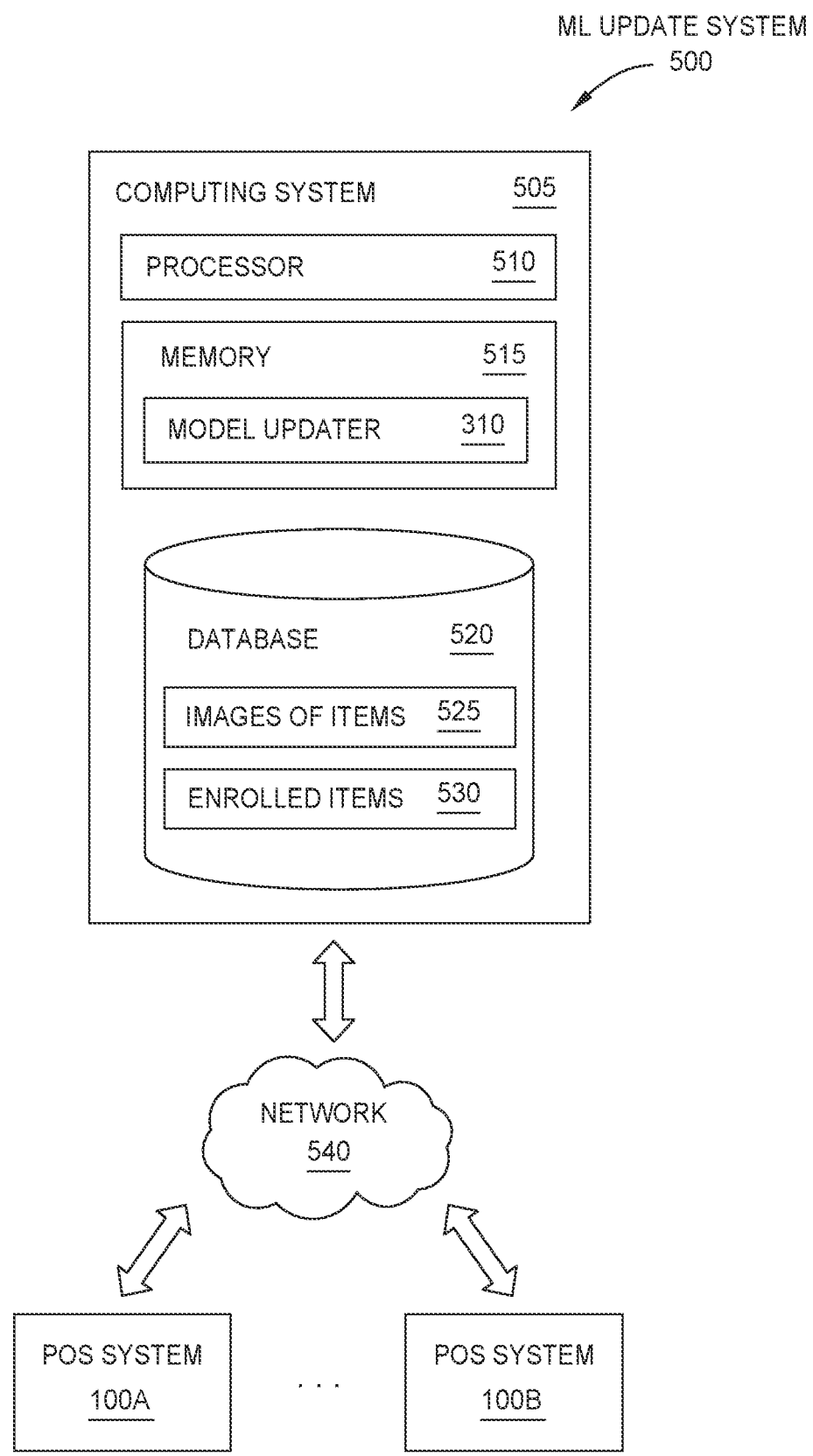
FIG. 5 illustrates a system for updating a ML model used by POS systems, according to an embodiment described herein.

FIG. 5 illustrates a ML update system 500 for updating the ML model used by POS systems 100, according to an embodiment described herein. The ML update system 500 includes a computing system 505 with a processor 510, memory 515, and database 520. In general, the computing system 505 can be a single computing device (e.g., a server) or a collection of computing devices (e.g., compute resources in a data center or cloud computing environment).

The processor 510 is any electronic circuitry, including, but not limited to one or a combination of microprocessors, microcontrollers, application specific integrated circuits (ASIC), application specific instruction set processor (ASIP), and/or state machines, that communicatively couples to memory 515 and controls the operation of the computing system 505. The processor 510 may be 8-bit, 16-bit, 32-bit, 64-bit or of any other suitable architecture. The processor 510 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 510 may include other hardware that operates software to control and process information. The processor 510 executes software stored on the memory 515 to perform any of the functions described herein. The processor 510 controls the operation and administration of the computing system 505 by processing information (e.g., information received from the POS systems 100). The processor 510 is not limited to a single processing device and may encompass multiple processing devices.

The memory 515 may store, either permanently or temporarily, data, operational software, or other information for the processor 510. The memory 515 may include any one or a combination of volatile or non-volatile local or remote devices suitable for storing information. For example, the memory 515 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 515, a disk, a CD, or a flash drive. In particular embodiments, the software may include an application executable by the processor 510 to perform one or more of the functions described herein.

In this example, the memory 515 stores the model updater 310 which can include the training application and tester illustrated in FIG. 3. The model updater 310 can be a software application that is executed by the processor 510.

The database 520 can include memory organized to store images 525 of items and a list of enrolled items 530. The images 525 can include both images of unenrolled items as well as enrolled items. The images of the unenrolled items can be collected and then used as discussed in method 400 to enroll new items using the automated process described herein. The images of the enrolled items can be used by the tester to verify that when retraining the ML model, the updated ML model can still accurately identify the previously enrolled items.

The list of enrolled items 530 can include all the items the ML model has been trained to recognize. When the method 400 is completed successfully, the list of enrolled items 530 can be updated to include the new item. Moreover, when a store no longer carries an enrolled item, this list can be updated to remove the item. Further, it may be advantageous to retrain the ML model using the current enrolled items. In other words, if the ML model no longer needs to recognize a particular item, retraining the ML model to recognize the remaining enrolled items may result in a ML model that can more accurately detect those items relative to the previous ML model that was trained to recognize the larger list of enrolled items.

The system 500 also includes a network 540 for communicatively coupling the POS systems 100 and the computing system 505. The network 540 is any suitable network operable to facilitate communication between the components of the system 500. The network 540 may include any interconnecting system capable of transmitting audio, video, signals, data, messages, or any combination of the preceding. The network 540 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. In one embodiment, rather than having a separate computing system 505 for executing the model updater 310, this component (as well as the images 525) may be hosted by one of the POS systems 100. In that case, the network 540 can be used to push the updated ML model derived by one of the POS system 100 to the other POS systems 100.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may include a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    receiving, at a computing system, images of a new item captured at a point of sale (POS) system, wherein the POS system comprises a computer vision system including a machine learning (ML) model that has not yet been trained to recognize the new item;
    retraining, at the computing system, the ML model using a first subset of the images to generate an updated ML model capable of recognizing the new item;
    testing, at the computing system, the updated ML model using a second subset of the images to verify the updated ML model can identify the new item;
    testing, at the computing system, the updated ML model to verify the updated ML model can identify other items the ML model was previously trained to recognize;
    upon determining the updated ML model can identify the new item and the other items, transmitting the updated ML model to the POS system to replace the ML model; and
    upon determining the updated ML model cannot identify the new item and the other items:
        retraining, at the computed system, the updated ML model using at least a portion of the second subset of the images to generate a second updated ML model capable of recognizing the new item;
        testing, at the computing system, the second updated ML model using at least a portion of the first subset of the images to verify the second updated ML model can identify the new item;
        testing, at the computing system, the second updated ML model to verify the second updated ML model can identify other items the ML model was previously trained to recognize; and
        upon determining the second updated ML model can identify the new item and the other items, transmitting the second updated ML model to the POS system to replace the ML model.

2. The method of claim 1, further comprising, before retraining the ML model:
    dividing, at the computing system, the images of the new item into an annotated training data set and a validation data set, wherein the annotated training data set is used to retrain the ML model while the validation data set is used to test the updated ML model to verify the updated ML model can accurately identify the new item, wherein dividing the images of the new item, retraining the ML model, testing the updated ML model, and transmitting the updated ML model are all performed by a computing system without human intervention.

3. The method of claim 1, wherein the images of the new item are annotated to indicate that the images contain the new item based on a user action performed at the POS system during a checkout process.

4. The method of claim 1, further comprising:
receiving, at the computing system, second images of the new item captured at a plurality of POS systems, wherein the second images are used to retrain the ML model and test the updated ML model to verify the updated ML model can identify the new item.

5. The method of claim 4, further comprising:
transmitting the updated ML model to the plurality of POS systems, wherein each of the plurality of POS systems executes the updated ML model in respective computer vision systems.

6. The method of claim 5, wherein the plurality of POS systems are located in different stores.

7. The method of claim 4, further comprising:
verifying that the images of a new item captured at the POS system and the second images of the new item captured at the plurality of POS systems satisfy a minimum number threshold before retraining the ML model.

8. A computing system, comprising:
a processor; and
memory storing an application which, when executed by the processor, performs an operation, the operation comprising:
receiving images of a new item captured at a point of sale (POS) system, wherein the POS system comprises a computer vision system associated with a machine learning (ML) model that has not yet been trained to recognize the new item;
retraining the ML model using a first subset of the images to generate an updated ML model capable of recognizing the new item;
testing the updated ML model using a second subset of the images to verify the updated ML model can identify the new item;
testing the updated ML model to verify the updated ML model can identify other items the ML model was previously trained to recognize;
upon determining the updated ML model can identify the new item and the other items, replacing the ML model with the updated ML model; and
upon determining the updated ML model cannot identify the new item and the other items:
retraining the updated ML model using at least a portion of the second subset of the images to generate a second updated ML model capable of recognizing the new item;
testing the second updated ML model using at least a portion of the first subset of the images to verify the second updated ML model can identify the new item;
testing the second updated ML model to verify the second updated ML model can identify other items the ML model was previously trained to recognize; and
upon determining the second updated ML model can identify the new item and the other items, replacing the ML model with the second updated ML model.

9. The computing system of claim 8, wherein replacing the ML model with the updated ML model comprises:
transmitting the updated ML model to the POS system, wherein the updated ML model is executed locally at the POS system.

10. The computing system of claim 8, wherein replacing the ML model with the updated ML model comprises:
transmitting the updated ML model to a central repository separate from the POS system, wherein the computer vision system of the POS system is configured to transmit images to the central repository to be processed by the updated ML model.

11. The computing system of claim 8, wherein the operation further comprises, before retraining the ML model:
dividing the images of the new item into an annotated training data set and a validation data set, wherein the annotated training data set is used to retrain the ML model while the validation data set is used to test the updated ML model to verify the updated ML model can identify the new item.

12. The computing system of claim 8, wherein the operation further comprises:
receiving second images of the new item captured at a plurality of POS systems, wherein the second images are used to retrain the ML model and test the updated ML model to verify the updated ML model can identify the new item.

13. The computing system of claim 12, wherein the plurality of POS systems are located in different stores.

14. The computing system of claim 12, wherein the operation further comprises:
verifying that the images of a new item captured at the POS system and the second images of the new item captured at the plurality of POS systems satisfy a minimum number threshold before retraining the ML model.

15. A non-transitory computer readable storage medium having program instructions embodied therewith, the program instructions executable by a processor to perform an operation, the operation comprising: receiving images of a new item captured at a point of sale (POS) system, wherein the POS system comprises a computer vision system associated with a machine learning (ML) model that has not yet been trained to recognize the new item; retraining the ML model using a first subset of the images to generate an updated ML model capable of recognizing the new item; testing the updated ML model using a second subset of the images to verify the updated ML model can identify the new item; testing the updated ML model to verify the updated ML model can identify other items the ML model was previously trained to recognize; upon determining the updated ML model can identify the new item and the other items, replacing the ML model with the updated ML model; and upon determining the updated ML model cannot identify the new item and the other items: retraining the updated ML model using at least a portion of the second subset of the images to generate a second updated ML model capable of recognizing the new item; testing the second updated ML model using at least a portion of the first subset of the images to verify the second updated ML model can identify the new item: testing the second updated ML model to verify the second updated ML model can identify other items the ML model was previously trained to recognize; and upon determining the second updated ML model can identify the new item and the other items, replacing the ML model with the second updated ML model.

16. The non-transitory computer readable storage medium of claim 15, wherein replacing the ML model with the updated ML model comprises:
transmitting the updated ML model to the POS system, wherein the updated ML model is executed locally at the POS system.

17. The non-transitory computer readable storage medium of claim 15, wherein replacing the ML model with the updated ML model comprises:
 transmitting the updated ML model to a central repository separate from the POS system, wherein the computer vision system of the POS system is configured to transmit images to the central repository to be processed by the updated ML model.

18. The non-transitory computer readable storage medium of claim 15, wherein the operation further comprises, before retraining the ML model:
 dividing the images of the new item into an annotated training data set and a validation data set, wherein the annotated training data set is used to retrain the ML model while the validation data set is used to test the updated ML model to verify the updated ML model can identify the new item.

19. The non-transitory computer readable storage medium of claim 15, wherein the operation further comprises:
 receiving second images of the new item captured at a plurality of POS systems, wherein the second images are used to retrain the ML model and test the updated ML model to verify the updated ML model can identify the new item.

20. The non-transitory computer readable storage medium of claim 19, wherein the plurality of POS systems are located in different stores.

\* \* \* \* \*

UNITED STATES PATENT AND TRADEMARK OFFICE
CERTIFICATE OF CORRECTION

PATENT NO. : 12,050,663 B2
APPLICATION NO. : 17/490472
DATED : July 30, 2024
INVENTOR(S) : Judith L. Atallah et al.

It is certified that error appears in the above-identified patent and that said Letters Patent is hereby corrected as shown below:

In the Claims

In Column 14, Line 56, in Claim 15, delete "item:" and insert -- item; --.

Signed and Sealed this
Twenty-ninth Day of October, 2024

Katherine Kelly Vidal
*Director of the United States Patent and Trademark Office*